(12) United States Patent
Huang (10) Patent No.: US 11,802,658 B1
(45) Date of Patent: Oct. 31, 2023

(54) ENGAGEMENT STRUCTURE OF CONNECTION SYSTEM

(71) Applicant: Wen-Shao Huang, Taichung (TW)

(72) Inventor: Wen-Shao Huang, Taichung (TW)

( * ) Notice: Subject to any disclaimer, the term of this patent is extended or adjusted under 35 U.S.C. 154(b) by 0 days.

(21) Appl. No.: 17/980,757

(22) Filed: Nov. 4, 2022

(51) Int. Cl.
*F16M 11/00* (2006.01)
*F16M 13/02* (2006.01)
*F41G 11/00* (2006.01)

(52) U.S. Cl.
CPC ......... *F16M 13/022* (2013.01); *F41G 11/003* (2013.01)

(58) Field of Classification Search
CPC .............................. F16M 13/022; F41G 11/003
See application file for complete search history.

(56) References Cited

U.S. PATENT DOCUMENTS

| | | | | |
|---|---|---|---|---|
| 9,568,281 | B1 * | 2/2017 | Chen | F41A 23/10 |
| 11,578,946 | B1 * | 2/2023 | Wan | F41G 1/35 |
| 11,742,793 | B2 * | 8/2023 | Garza | F16M 13/022 |
| | | | | 248/229.1 |
| 2013/0156495 | A1 * | 6/2013 | Li | F16B 2/12 |
| | | | | 403/322.4 |
| 2022/0282956 | A1 * | 9/2022 | Yan | F41G 11/003 |
| 2023/0054447 | A1 * | 2/2023 | Evitt | F16B 2/185 |
| 2023/0112612 | A1 * | 4/2023 | Lee | F41G 11/001 |
| | | | | 42/125 |
| 2023/0160664 | A1 * | 5/2023 | Stern | F41G 11/003 |
| | | | | 42/90 |
| 2023/0221097 | A1 * | 7/2023 | Melville | F41G 11/003 |
| | | | | 42/90 |

* cited by examiner

Primary Examiner — Amy J. Sterling (57) ABSTRACT

An engagement structure of a connection system contains: a holder, a movable fixer, an actuation protrusion, a connection rod, and an adjustment member. The holder includes a first connecting segment, a first positioning groove, a receiving groove, a rotation space, two coupling orifices, and a locating orifice. The movable fixer includes a sliding portion, a defining portion, a guide groove, a through hole, a second connecting segment, a second positioning groove, and a locking chamber defined between the first positioning groove and the second positioning groove. The actuation protrusion includes a rotatable joining segment, a trench, two first accommodation orifices, two second accommodation orifices, two spaced distances, and a driving segment. The connection rod includes a rotary knob, a threaded section, a rotatable connecting orifice, and a trough. Also, the adjustment member includes a screwing section and a notch.

3 Claims, 10 Drawing Sheets

ENGAGEMENT STRUCTURE OF CONNECTION SYSTEM

FIELD OF THE INVENTION

The present invention relates to an engagement structure of a connection system which is applicable for a connection of a flashlight, a grip/a handle, a tripod, a bayonet, or a camera.

BACKGROUND OF THE INVENTION

At present, survival games are one of the most popular leisure entertainments for many young players. Survival games are mainly based on grouping players to engage in air gun battles in abandoned buildings or in the wild. If you want to increase the aiming effect, you can install the sight on the Picatinny rail of the air gun in a screwing connection manner.

However, it is easy to cause falling of screw(s) from the air gun. In order to facilitate the operation, the screws must protrude from the main body. However, the screws protruding from the main body are easy to hook other objects. In addition, it is troublesome to screw the screws with the air gun.

The present invention has arisen to mitigate and/or obviate the afore-described disadvantages.

SUMMARY OF THE INVENTION

The primary objective of the present invention is to provide an engagement structure of a connection system which is capable of overcoming the shortcomings of the conventional engagement structure of the connection system.

To obtain above-mentioned aspect, an engagement structure of a connection system provided by the present invention contains: a holder, a movable fixer, an actuation protrusion, a connection rod, and an adjustment member.

The holder includes a first connecting segment formed on a side of a bottom of the holder, a first positioning groove defined in the first connecting segment, a receiving groove defined in a front end of the holder, a rotation space formed in a rear end of the holder and communicating with the rotation space, two coupling orifices defined on two predetermined positions of two sides of the holder, and a locating orifice formed on a predetermined position of a top of the holder. The two coupling orifices are coaxial.

The movable fixer includes a sliding portion formed on a first end of the movable fixer and corresponding to the receiving groove of the holder, a defining portion formed on a second end of the movable fixer. The sliding portion is slidably accommodated in the receiving groove of the holder, a guide groove formed in the defining portion, a through hole defined in the defining portion and communicating with the guide groove, a second connecting segment formed on a bottom of the movable fixer and corresponding to the first connecting segment of the holder, a second positioning groove defined on the bottom of the movable fixer and corresponding to the first positioning groove of the holder, such that an locking chamber is defined between the first positioning groove and the second positioning groove;

an actuation protrusion received in the rotation space of the holder, and the actuation protrusion including a rotatable joining segment formed on the actuation protrusion and corresponding to the rotation space, a trench formed in an intermediate portion of the joining segment, two first accommodation orifices and two second accommodation orifices which are formed on two outer extensions of the joining segment, two spaced distances. A spaced distance is defined between the two first accommodation orifices, and the other spaced distance is defined between the two second accommodation orifices, such that the two second accommodation orifices are aligned with the two coupling orifices of the holder and are configured to rotatably connect two first coupling posts with the two second accommodation orifices and the two coupling orifices of the holder. The actuation protrusion further includes a driving segment formed on a rear end thereof.

The connection rod received in the trench of the actuation protrusion and the guide groove of the movable fixer and extending out of the through hole. The connection rod includes a rotary knob formed on a first end thereof, a threaded section formed on a second end of the connection rod, a rotatable connecting orifice defined in the rotary knob and aligned with the two first accommodation orifices of the actuation protrusion, such that the rotatable connecting orifice and the two first accommodation orifices are connected with the actuation protrusion via two second coupling posts. The connection rod further includes a trough defined around the threaded section.

an adjustment member accommodated in the through hole of the movable fixer, and the adjustment member including a screwing section formed on a first end of the adjustment member, a notch defined on a second end of the adjustment member, such that the threaded section of the connection rod is screwed with the screwing section of the adjustment member, and the trough extends out of the notch to be engaged by a C-shaped retainer, such that the locking chamber between the first positioning groove of the holder and the second positioning groove of the movable fixer is engaged with or is disengaged from the connection rod by moving the actuation protrusion to drive the connection rod to engage with or disengage from the locking chamber.

DETAILED DESCRIPTION OF THE PREFERRED EMBODIMENTS

With reference to FIGS. 1-5, an engagement structure of a connection system according to a preferred embodiment of the present invention comprises:
- a holder 10 including a first connecting segment 11 formed on a side of a bottom of the holder 10, a first positioning groove 12 defined in the first connecting segment 11, a receiving groove 14 defined in a front end of the holder 10, a rotation space 13 formed in a rear end of the holder 10 and communicating with the rotation space 13, two coupling orifices 16 defined on two predetermined positions of two sides of the holder 10, and a locating orifice 15 formed on a predetermined position of a top of the holder 10, wherein the two coupling orifices 16 are coaxial;
- a movable fixer 30 including a sliding portion 23 formed on a first end of the movable fixer 30 and corresponding to the receiving groove 14 of the holder 10, a defining portion 24 formed on a second end of the movable fixer 20, wherein the sliding portion 23 is slidably accommodated in the receiving groove 24 of the holder 10, a guide groove 25 formed in the defining portion 24, a through hole 26 defined in the defining portion 24 and communicating with the guide groove 25, a second connecting segment 21 formed on a bottom of the movable fixer 20 and corresponding to the first connecting segment 11 of the holder 10, a second positioning groove 22 defined on the bottom of the movable fixer 20 and corresponding to the first positioning groove 12 of the holder 10, such that an locking chamber A is defined between the first positioning groove 12 and the second positioning groove 22;
- an actuation protrusion 30 received in the rotation space 13 of the holder 10, and the actuation protrusion 30 including a rotatable joining segment 31 formed on the actuation protrusion 30 and corresponding to the rotation space 13, a trench 35 formed in an intermediate portion of the joining segment 31, two first accommodation orifices 33 and two second accommodation orifices 32 which are formed on two outer extensions of the joining segment 31, and two spaced distances, wherein a spaced distance is defined between the two first accommodation orifices 33, and the other spaced distance is defined between the two second accommodation orifices 32, such that the two second accommodation orifices 32 are aligned with the two coupling orifices 16 of the holder 10 and are configured to rotatably connect two first coupling posts 36 with the two second accommodation orifices 32 and the two coupling orifices 16 of the holder 10, wherein the actuation protrusion 30 further includes a driving segment 34 formed on a rear end thereof;
- a connection rod 40 received in the trench 35 of the actuation protrusion 30 and the guide groove 25 of the movable fixer 20 and extending out of the through hole 26, wherein the connection rod 40 includes a rotary knob 41 formed on a first end thereof, a threaded section 43 formed on a second end of the connection rod 40, a rotatable connecting orifice 42 defined in the rotary knob 41 and aligned with the two first accommodation orifices 33 of the actuation protrusion 30, such that the rotatable connecting orifice 42 and the two first accommodation orifices 33 are connected with the actuation protrusion 30 via two second coupling posts 37, wherein the two second coupling posts 37 of the connection rod 40 are rotatably eccentric along the two first coupling posts 36 of the actuation protrusion 30 over 180 degrees; wherein the connection rod 40 further includes a trough 44 defined around the threaded section 43; and
- an adjustment member 50 accommodated in the through hole 26 of the movable fixer 20, and the adjustment member 50 including a screwing section 54 formed on a first end of the adjustment member 50, a notch 51 defined on a second end of the adjustment member 50, such that the threaded section 43 of the connection rod 40 is screwed with the screwing section 54 of the adjustment member 50, and the trough 44 extends out of the notch 51 to be engaged by a C-shaped retainer 53; wherein the adjustment member 50 further includes an adjustable recess 52 defined thereon and configured to receive a flathead screwdriver (not shown), such that the adjustment member 50 is movable to adjust a distance in the locking chamber A; wherein the adjustable recess 52 is formed in various shapes, such as an horizontal I shape or a cross shape.

Figure 1:
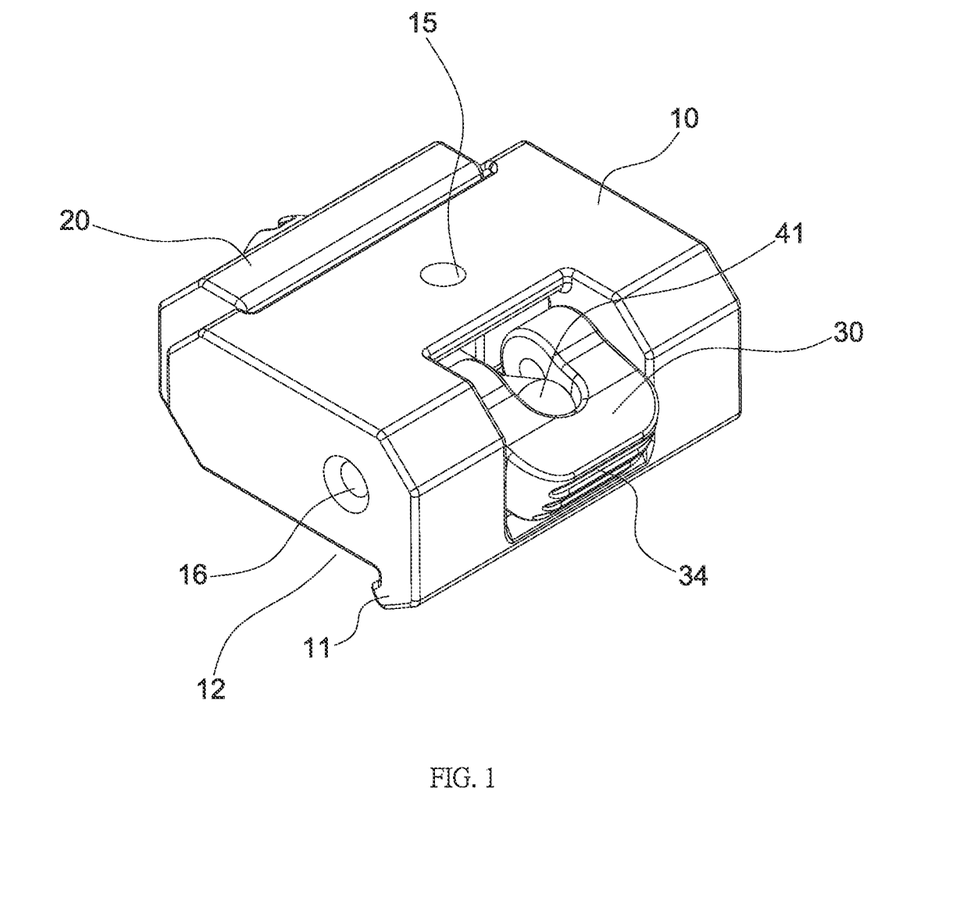
FIG. 1 is a perspective view showing the assembly of an engagement structure of a connection system according to a preferred embodiment of the present invention.
Figure 2:
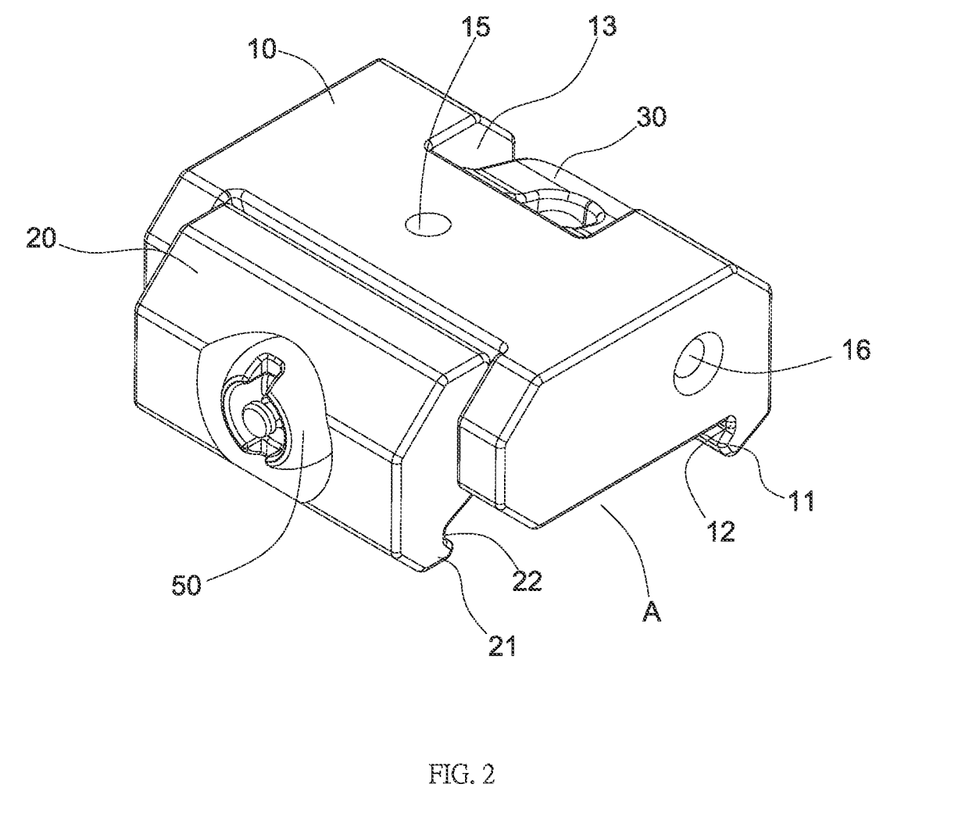
FIG. 2 is another perspective view showing the assembly of the engagement structure of the connection system according to the preferred embodiment of the present invention.
Figure 3:
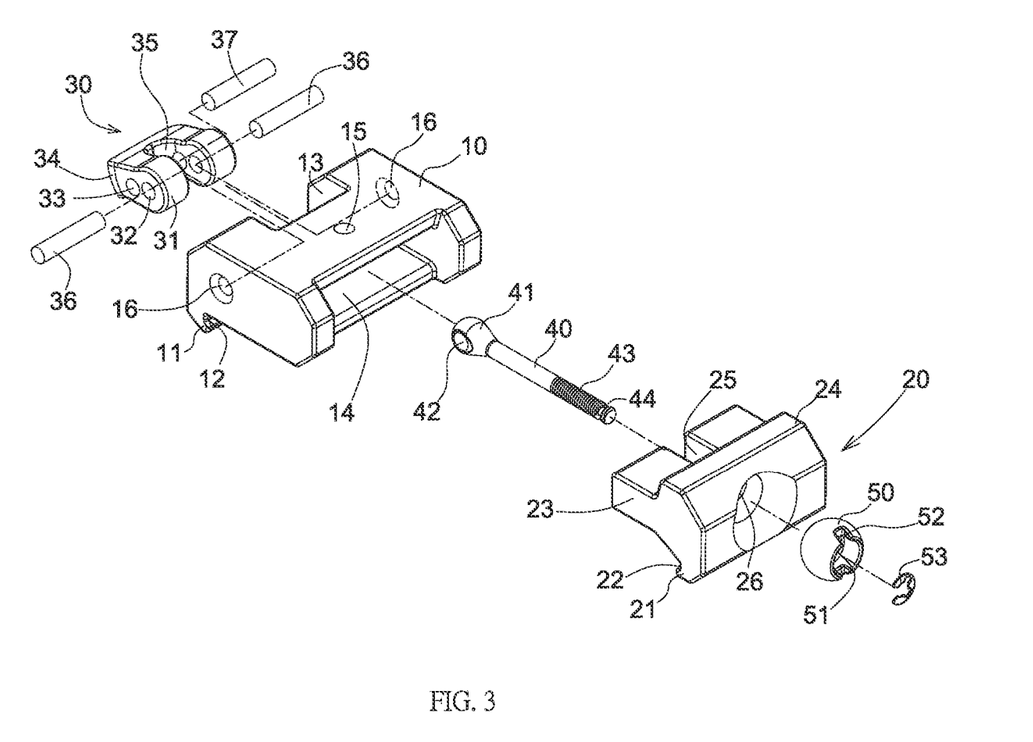
FIG. 3 is a perspective view showing the exploded components of the engagement structure of the connection system according to the preferred embodiment of the present invention.
Figure 4:
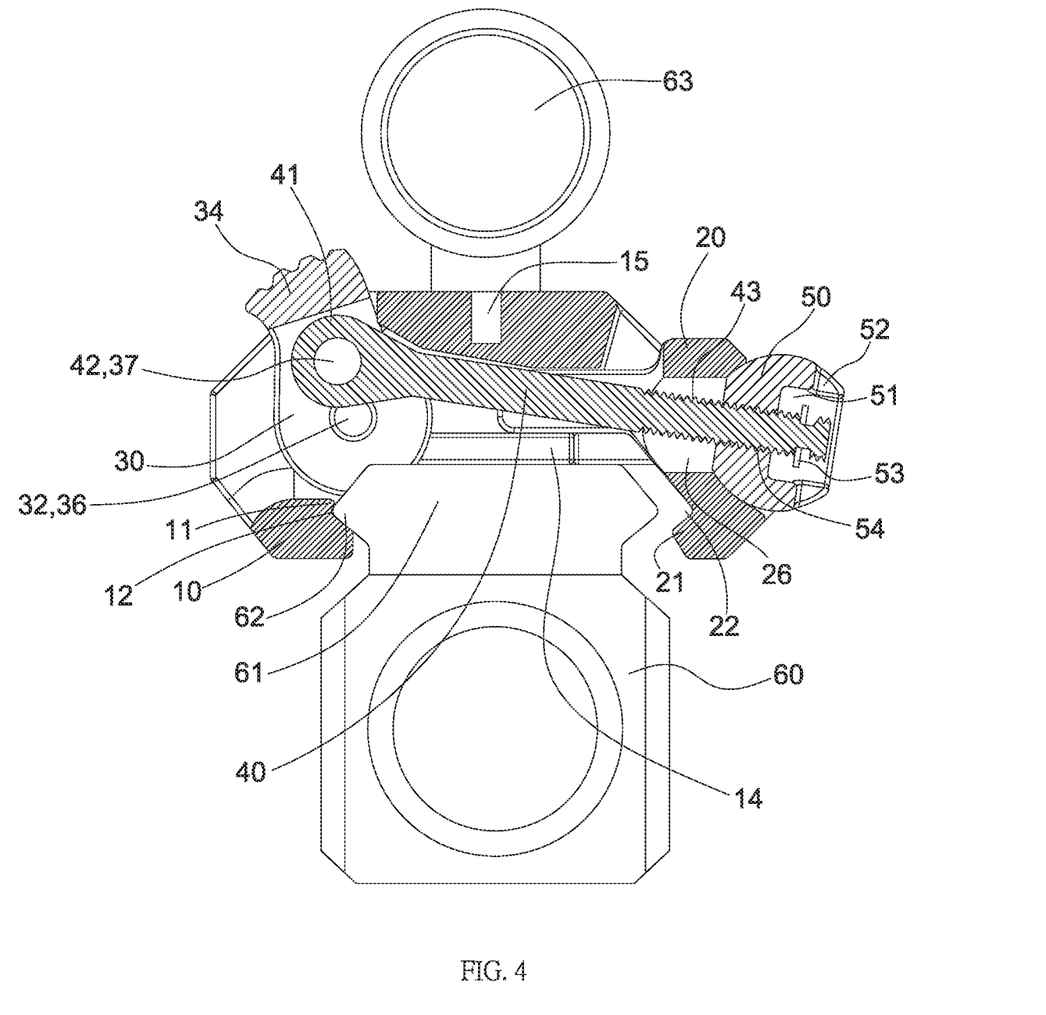
FIG. 4 is a cross sectional view showing the operation of the engagement structure of the connection system according to the preferred embodiment of the present invention.
Figure 5:
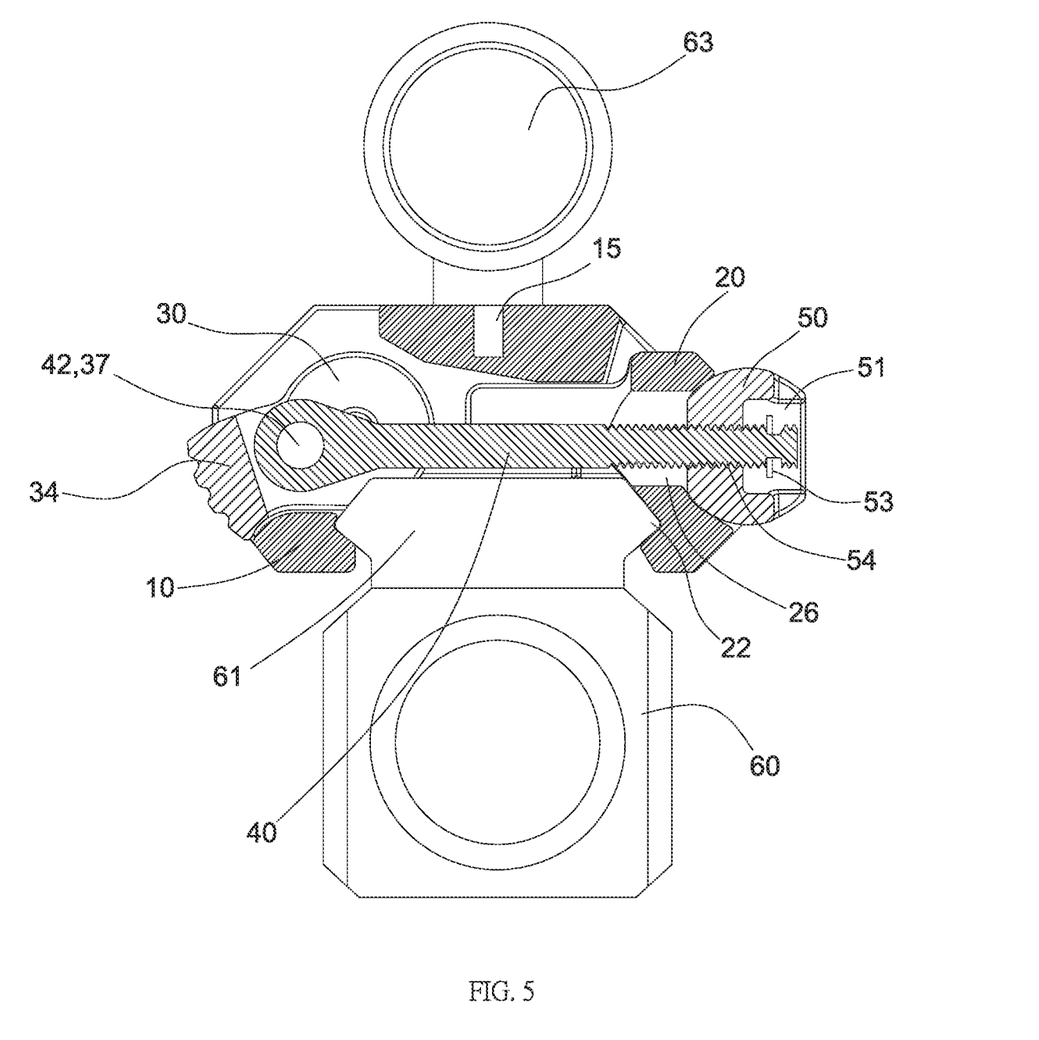
FIG. 5 is another cross sectional view showing the operation of the engagement structure of the connection system according to the preferred embodiment of the present invention.

Referring to FIGS. 4-5, the locking chamber A is movably engaged with an air gun. The engagement structure of the present invention is engaged in two fixing ridges 62 of two sides of a picatinny rail 61 of a barrel 60, and the locating orifice 15 of the holder 10 is configured to accommodate a sight 63 so that the sight 63 is located above the picatinny rail 61. Preferably, the engagement structure of the present invention is applicable for a connection of a flashlight, a grip/a handle, a tripod, a bayonet, or a camera. As shown in FIG. 4, the actuation protrusion 30 is moved upward so that the connection rod 40 is driven to disengaged from the locking chamber A, thus removing the sight 63 and the barrel 60. As illustrated in FIG. 5, the actuation protrusion 30 is pressed downward to drive the connection rod 40 to engage with the locking chamber A, thus connecting the sight 63 and the barrel 60.

Thereby, the locking chamber A between the first positioning groove 12 of the holder 10 and the second positioning groove 22 of the movable fixer 20 is engaged with or is disengaged from the connection rod 40 after the actuation protrusion 30 drives the connection rod 40.

Preferably, the through hole 26 of the movable fixer 20 is spherical so that the adjustment member 50 is rotated therein in any desired angles universally.

Figure 6:
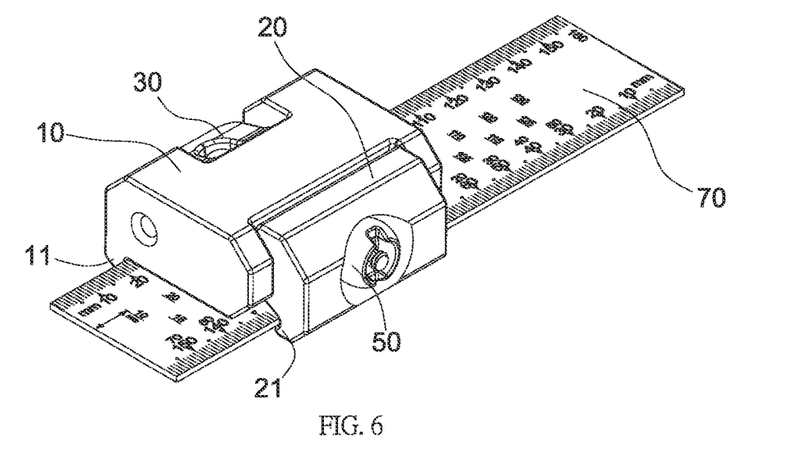
FIG. 6 is a perspective view showing the application of an engagement structure of a connection system according to another preferred embodiment of the present invention.
Figure 7:
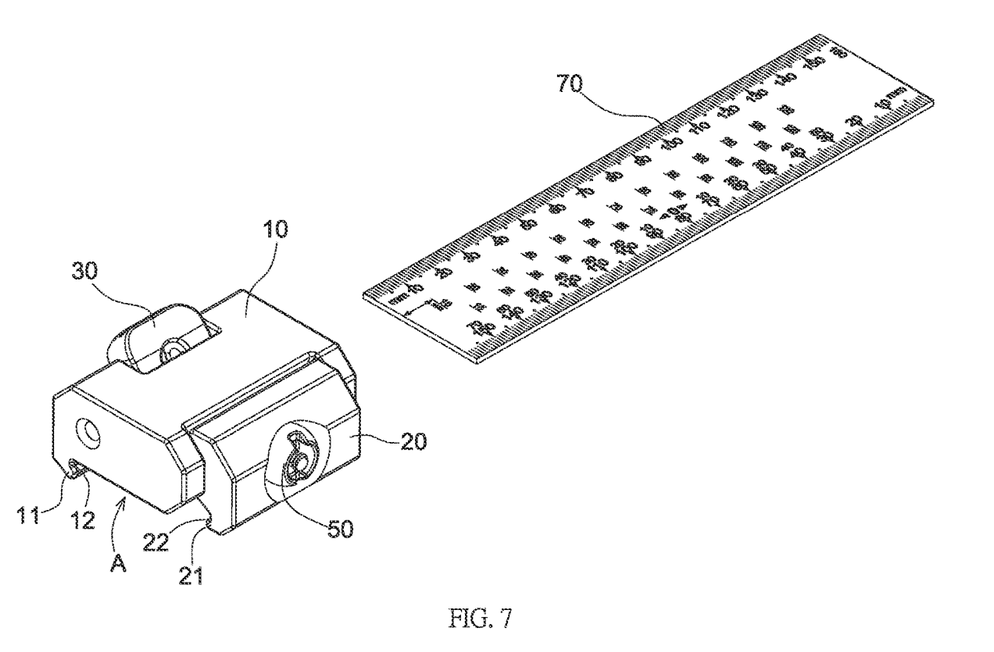
FIG. 7 is another perspective view showing the application of the engagement structure of the connection system according to the preferred embodiment of the present invention.

With reference to FIGS. 6-7, in another embodiment, the locking chamber A is movably engaged with an engineering ruler 70 so that a user cuts a workpiece or draws lines on a jig. For example, as shown in FIG. 6, the actuation protrusion 30 is moved to drive the connection rod 40 to engage the locking chamber A with the engineering ruler 70. As illustrated in FIG. 7, the actuation protrusion 30 is moved upward to drive the connection rod 40 to disengage the locking chamber A from the engineering ruler 70.

Figure 8:
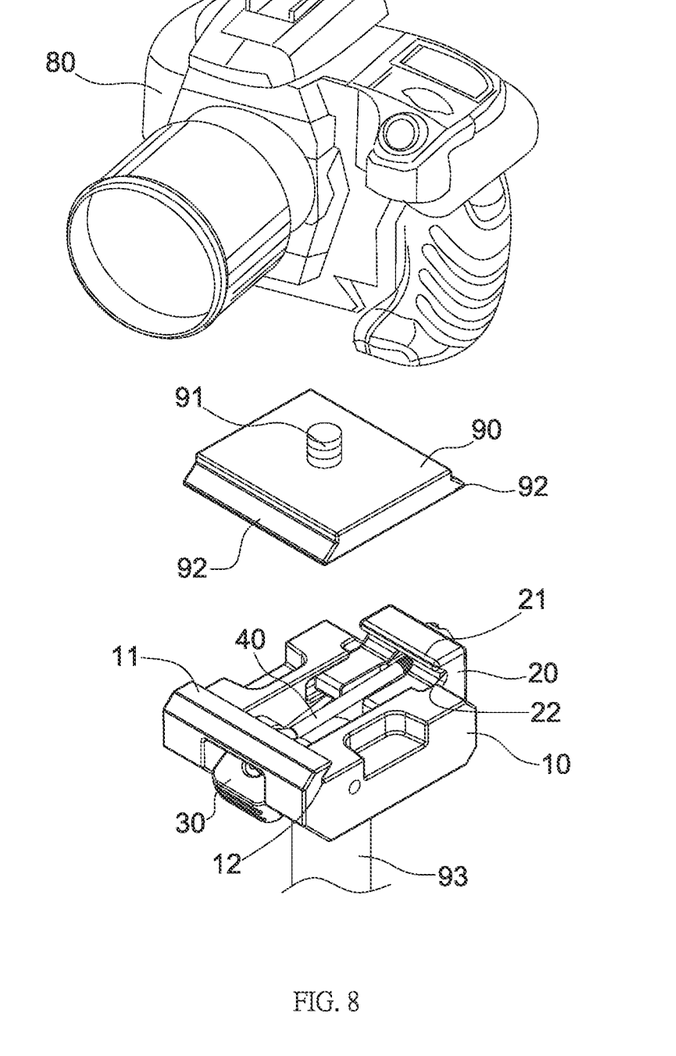
FIG. 8 is a perspective view showing the application of an engagement structure of a connection system according to another preferred embodiment of the present invention.
Figure 9:
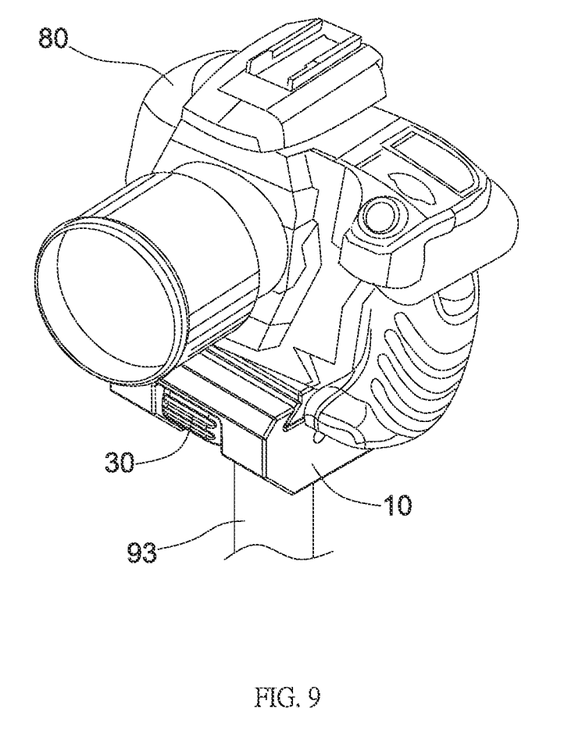
FIG. 9 is another perspective view showing the application of the engagement structure of the connection system according to the preferred embodiment of the present invention.

With reference to FIGS. 8-9, in another embodiment, the locking chamber A is movably engaged with a retainer 90, and the locating orifice 15 of the holder 10 is connected with a tripod 93, wherein the retainer 93 includes two abutting ribs 92 formed on two sides thereof, a threaded bolt 91 mounted on a top thereof and configured to screw with a threaded aperture (not shown) of a bottom of a camera 80 so that the camera 80 is connected with and detachable from the tripod 93. Referring to FIGS. 8, the actuation protrusion 30 is moved downward to drive the connection rod 40 to disengage from the locking chamber A, thus detaching the retainer 90 from the camera 80. As shown in FIG. 9, the actuation protrusion 30 is moved upward to drive the connection rod 40 to engage with the locking chamber A, thus connecting the retainer 90 with the camera 80.

Figure 10:
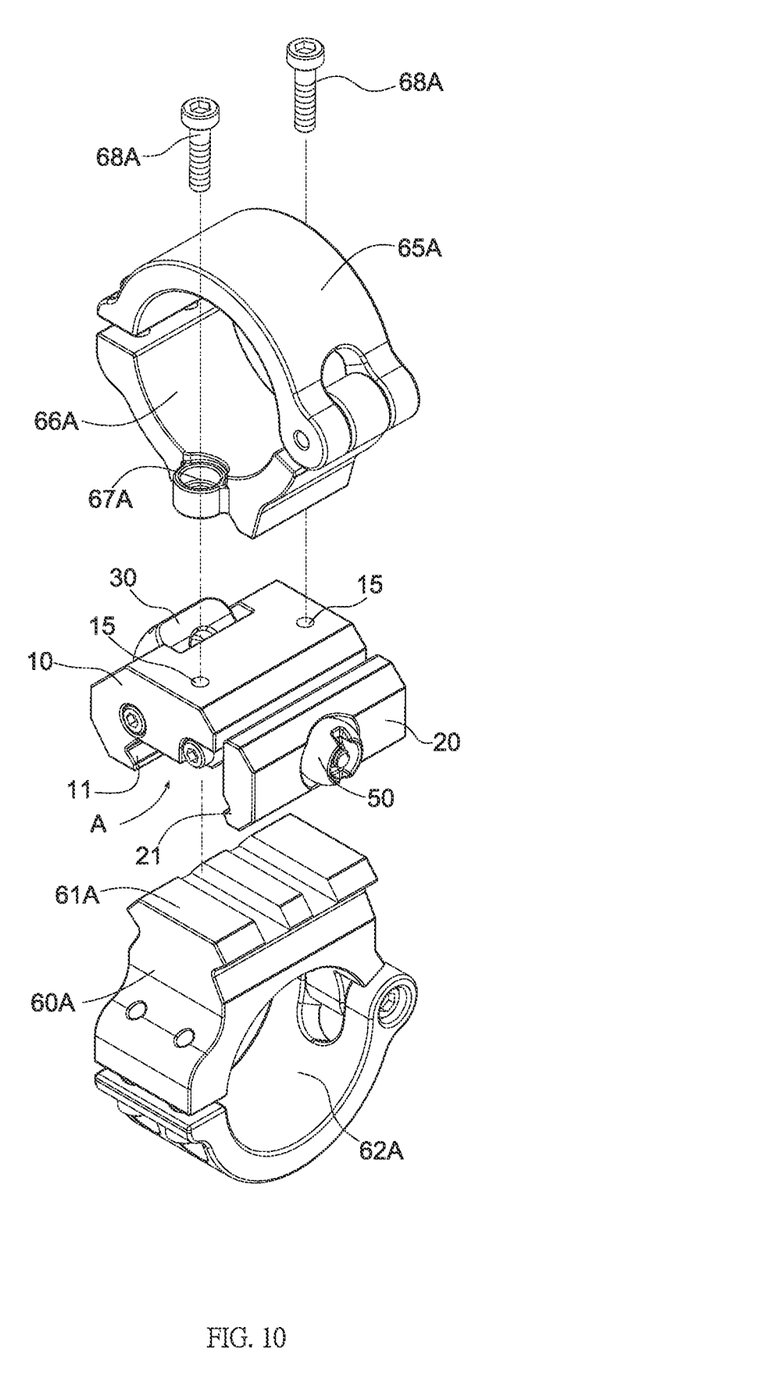
FIG. 10 is a perspective view showing the application of an engagement structure of a connection system according to another preferred embodiment of the present invention.
Figure 11:
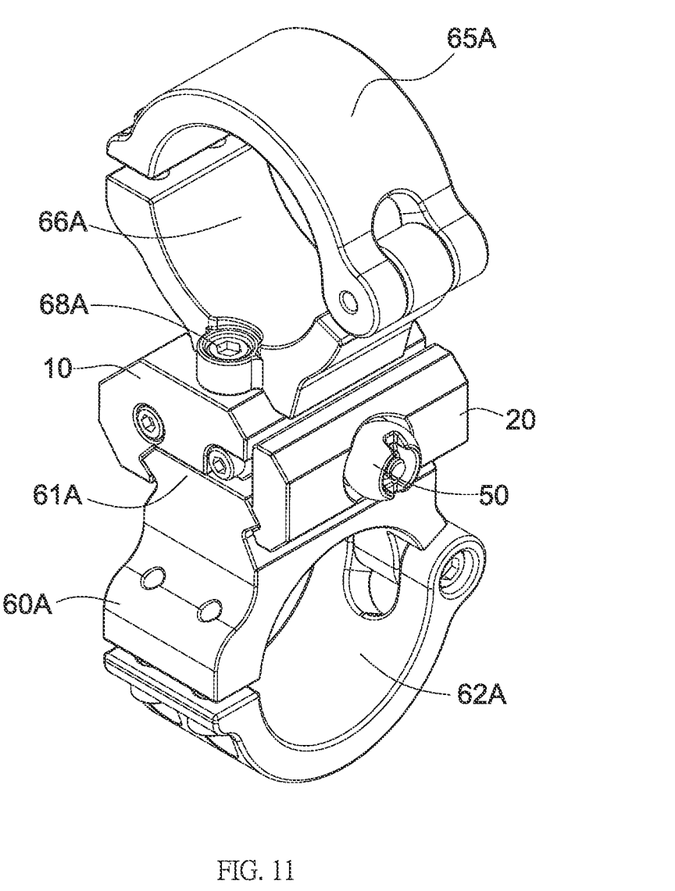
FIG. 11 is another perspective view showing the application of the engagement structure of the connection system according to the preferred embodiment of the present invention.

As illustrated in FIGS. 10-11, in another embodiment, the locking chamber A is movably engaged with the picatinny rail 61 of a fastener 60A of a gun (not shown), wherein the fastener 60A includes a fastening portion 62 A. The locating orifice 15 of the holder 10 is configured to accommodate a clamper 65A of a sight (not shown), wherein the damper 65A has an engaging portion 66A, two securing apertures 67A formed on two sides of the damper 65A, and two threaded bolt 68A received in the two securing apertures 67A and screwed into the locating orifice 15 of the holder 10, such that the fastener 60A of the gun (not shown) is detachably connected with the clamper 65A. As shown in FIG. 8, the actuation protrusion 30 is moved upward to drive the connection rod 40 to disengage from the locking chamber A, thus detaching the fastener 60A from the clamper 65A. As illustrated in FIG. 9, the actuation protrusion 30 is pressed downward to drive the connection rod 40 to engage with the locking chamber A, thus connecting the fastener 60A with the damper 65A.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An engagement structure of a connection system comprising:
    a holder including a first connecting segment formed on a side of a bottom of the holder, a first positioning groove defined in the first connecting segment, a receiving groove defined in a front end of the holder, a rotation space formed in a rear end of the holder and communicating with the rotation space, two coupling orifices defined on two predetermined positions of two sides of the holder, and a locating orifice formed on a predetermined position of a top of the holder, wherein the two coupling orifices are coaxial;
    a movable fixer including a sliding portion formed on a first end of the movable fixer and corresponding to the receiving groove of the holder, a defining portion formed on a second end of the movable fixer, wherein the sliding portion is slidably accommodated in the receiving groove of the holder, a guide groove formed in the defining portion, a through hole defined in the defining portion and communicating with the guide groove, a second connecting segment formed on a bottom of the movable fixer and corresponding to the first connecting segment of the holder, a second positioning groove defined on the bottom of the movable fixer and corresponding to the first positioning groove of the holder, such that an locking chamber is defined between the first positioning groove and the second positioning groove;
    an actuation protrusion received in the rotation space of the holder, and the actuation protrusion including a rotatable joining segment formed on the actuation protrusion and corresponding to the rotation space, a trench formed in an intermediate portion of the joining segment, two first accommodation orifices and two second accommodation orifices which are formed on two outer extensions of the joining segment, and two spaced distances, wherein a spaced distance is defined between the two first accommodation orifices, and the other spaced distance is defined between the two second accommodation orifices, such that the two second accommodation orifices are aligned with the two coupling orifices of the holder and are configured to rotatably connect two first coupling posts with the two second accommodation orifices and the two coupling orifices of the holder, wherein the actuation protrusion further includes a driving segment formed on a rear end thereof;
    a connection rod received in the trench of the actuation protrusion and the guide groove of the movable fixer and extending out of the through hole, wherein the connection rod includes a rotary knob formed on a first end thereof, a threaded section formed on a second end of the connection rod, a rotatable connecting orifice defined in the rotary knob and aligned with the two first accommodation orifices of the actuation protrusion, such that the rotatable connecting orifice and the two first accommodation orifices are connected with the actuation protrusion via two second coupling posts; wherein the connection rod further includes a trough defined around the threaded section; and
    an adjustment member accommodated in the through hole of the movable fixer, and the adjustment member including a screwing section formed on a first end of the adjustment member, a notch defined on a second end of the adjustment member, such that the threaded section of the connection rod is screwed with the screwing section of the adjustment member, and the trough extends out of the notch to be engaged by a C-shaped retainer, such that the locking chamber between the first positioning groove of the holder and the second positioning groove of the movable fixer is engaged with or is disengaged from the connection rod by moving the actuation protrusion to drive the connection rod to engage with or disengage from the locking chamber.

2. The engagement structure of the connection system as claimed in claim 1, wherein the through hole of the movable fixer is spherical so that the adjustment member is rotated therein in any desired angles universally.

3. The engagement structure of the connection system as claimed in claim 1, wherein the two second coupling posts of the connection rod are rotatably eccentric along the two first coupling posts of the actuation protrusion over 180 degrees.

* * * * *